United States Patent Office 3,000,875
Patented Sept. 19, 1961

---

3,000,875
METHOD OF REDUCING THE DEGREE OF POLYMERIZATION OF CELLULOSIC MATERIALS
John H. E. Herbst, L'Orignal, Ontario, and Warren B. Beazley and Hans A. Krässig, both of Hawkesbury, Ontario, Canada, assignors to Canadian International Paper Company, Montreal, Canada, a corporation of Quebec
No Drawing. Filed Apr. 23, 1959, Ser. No. 808,293
11 Claims. (Cl. 260—212)

This invention relates to a process for lowering the degree of polymerization and viscosity of wood pulps.

In the manufacture of cellulosic materials, particularly dissolving pulps for conversion to cellulose derivatives such as rayon, it is frequently necessary to lower the degree of polymerization and the viscosity of the pulp in preparing it for the conversion process in which further lowering of degree of polymerization and viscosity takes place. Much of this preliminary decrease has heretofore been accomplished in an alkaline sodium hypochlorite bleaching stage with the consequent disadvantages of high cost of sodium hypochlorite and sodium hydroxide required to lower the degree of polymerization and viscosity to the desired value and too much time necessary to accomplish the desired decrease.

The present invention accomplishes, as among its objects, the results of decrease of the degree of polymerization and viscosity and an increase in brightness of the pulp at lower cost and in a shorter time. It apparently involves a combined reaction between oxidation and reducing agents and between one or both of these agents and the pulp.

The invention is based on the discovery that when a cellulosic material such as wood pulp, the oxidizing agent sodium chlorate and the reducing agent sulfur dioxide are reacted with each other in an aqueous acid medium, a large and unexpected decrease in the degree of polymerization and viscosity of the cellulosic material occurs, also with an increase in brightness, and that, when air is present in addition to the above-mentioned reagents, the resulting decrease in the degree of polymerization is even larger.

The process may be performed at any desired stage after cooking and preferably in the bleaching sequence, and preferably comprises the gradual addition of sulfur dioxide and, preferably, air to a mixture of the cellulosic material, water, sodium chlorate, and a sufficient amount of an acid, such as sulfuric acid, to lower the pH to a value between 1 and 6.5 or, preferably, 1 and 3.5. The addition of sulfur dioxide and air is preferably continued until the sodium chlorate has been substantially consumed.

While it is convenient to add sulfur dioxide to the pulp suspended in an acidified solution of sodium chlorate, similar results are obtained when the sodium chlorate is added to the pulp suspended in a solution of sulfur dioxide.

The amount of sodium chlorate added may vary between 0.1 and 10% on the pulp. Enough sulfur dioxide should be added to satisfy the following reactions:

$$NaClO_3 + 3SO_2 + 3H_2O \rightarrow NaCl + 3H_2SO_4 \quad (1)$$
$$O_2 + 2SO_2 + 2H_2O \rightarrow 2H_2SO_4 \quad (2)$$

In Reaction 1 192 parts of sulfur dioxide react with 106 parts of sodium chlorate; the amount of sulfur dioxide required for Reaction 2 depends on the reaction conditions (ease of access of oxygen) and ranges between 0 and 200% of the amount required for Reaction 1.

The process according to the invention may be performed at any convenient temperature between 0° C. and the boiling point of the solution. A suitable temperature has been found to be 50° C. It is applicable to all pulp consistencies, but practical values range between 1 and 25%.

While the process above described very efficiently lowers the degree of polymerization, it may be supplemented by a preferably subsequent bleaching stage, such as one employing hypochlorite which when thus used involves a substantial reduction in the consumption of hypochlorite as compared with the use of such a bleaching stage alone. Other suitable bleaches may be used, for instance peroxide and chlorine dioxide.

A bleaching process combined with the pulp-sodium chlorate-sulfur dioxide reaction may be desirable because, although without the bleaching stage the process produces an increase in brightness as well as a decrease in the degree of polymerization, this increase in brightness may not be in accordance with the brightness desired. Under these circumstances brightness may be increased by supplemental bleaching.

The additional bleaching stage may also be desirable to decrease to acceptable levels the copper number and hot sodium hydroxide solubility of the pulp, which under some circumstances may be too high.

When a bleached pulp of low degree of polymerization (e.g. 550, as calculated from the viscosity of a cuprammonium solution of the pulp) is required, the use of the process according to the invention without an additional bleaching stage may in some instances give pulps having excessively high copper numbers and excessively high solubilities in 7.14% sodium hydroxide solution at 100° C. This indicates a high content of carbonyl groups, and is an undesirable characteristic.

If a part of the desired lowering of viscosity is brought about by the pulp-sodium chlorate-sulfur dioxide reaction, and the remainder is then brought about in a sodium hypochlorite bleaching stage or equivalent, the resulting pulps have acceptable copper numbers and solubilities in boiling 7.14% sodium hydroxide solution, while the cost of the chemicals is considerably lower than if sodium hypochlorite alone had been used.

The following examples are illustrative:

Example I

A sulfite pulp was made from a wood mixture comprising 80% hardwoods (maples, elm, poplar) and 20% softwood (spruce, balsam fir), and subsequently chlorinated and treated with a hot solution of sodium hydroxide. Its degree of polymerization was 1090, its copper number (determined by TAPPI method T 215m) was 1.49, and its solubility in 7.14% sodium hydroxide solution at 100° C. was 15.4%.

The pulp was mixed with water to give a 6% suspension. To this, 0.75% sodium chlorate, based on pulp, was added, and the pH was adjusted to 3.1 by the addition of sulfuric acid. The temperature was raised to 50° C. A solution of sulfur dioxide was then slowly pumped into the mixture, which was stirred continuously. The equipment was arranged in such a way that the pulp mixture was accessible to the air.

The addition of the sulfur dioxide solution was stopped when the persistence of sulfur dioxide in the pulp mixture was indicated by its ability to decolorize starch-iodine. The reaction time was 55 minutes. The terminal pH was 1.7. The pulp was then washed.

The pulp thus prepared had a degree of polymerization of 750, a copper number of 1.90, and a hot sodium hydroxide solubility of 21.1%. A control run performed similarly except that no sulfur dioxide was added, gave a pulp having a degree of polymerization of 1070.

This example demonstrates the great reduction in degree of polymerization brought about by the process according to the invention.

Example II

This is similar to Example I, except that a 10% suspension of pulp in water was used. The reaction time was 130 minutes. The initial pH was 2.9 and the terminal pH 1.5.

The resulting pulp had a degree of polymerization of 580, a copper number of 2.33, and a hot sodium hydroxide solubility of 24.1%. A control run without sulfur dioxide gave a pulp having a degree of polymerization of 1060.

This shows that the process according to the invention operates more efficiently at a pulp concentration of 10% than at a pulp concentration of 6%, presumably because of the increase of the surface area of the pulp mass.

Example III

This was similar to Example II, except that 0.4% sodium chlorate, based on the pulp, was used.

The resulting pulp had a degree of polymerization of 740, a copper number of 1.98, and a hot sodium hydroxide solubility of 19.8%.

This shows that the drop in the degree of polymerization varies with the amount of sodium chlorate employed.

Example IV

This was similar to Example III, except that a different starting pulp was used. This starting pulp had a degree of polymerization of 1070, a copper number of 1.41 and a hot sodium hydroxide solubility of 15.8%. The reaction time was 105 minutes.

After the reaction, the pulp had a degree of polymerization of 660, a copper number of 2.40, and a hot sodium hydroxide solubility of 21.6%.

Example V

This was similar to Example IV, except that the order of addition of the reagents was reversed, i.e. the sulfur dioxide was mixed with the pulp, and the sodium chlorate was then added. The resulting pulp had a degree of polymerization of 670, a copper number of 2.13 and a hot sodium hydroxide solubility of 20.6%.

This shows that the properties of the resulting pulp are substantially independent of the order of addition of the reagents.

Example VI

This was similar to Example IV, except that the reaction was performed under nitrogen. The resulting pulp had a degree of polymerization of 850, and a hot sodium hydroxide solubility of 17.8%.

This shows that air helps to reduce the degree of polymerization.

Example VII

The pulp was treated as in Example I and was then bleached with sodium hypochlorite in a 6% aqueous suspension at 60° and pH 10–10.5. The consumption of sodium hypochlorite was 1.2% (as available chlorine, based on pulp). The pulp thus bleached had a degree of polymerization of 600, a copper number of 1.10, and a hot sodium hydroxide solubility of 13.5%.

This shows that if the process according to the invention is followed by a hypochlorite bleaching stage, the copper number and hot sodium hydroxide solubility may be lowered substantially.

We claim:
1. A process for lowering the degree of polymerization and the viscosity of cellulosic material which comprises reacting in an aqueous medium at a pH below 7.0, sodium chlorate, sulfur dioxide and the cellulosic material.
2. A process as set forth in claim 1 in which the reaction takes place in the presence of air.
3. A process as set forth in claim 1 followed by bleaching the pulp.
4. A process for lowering the degree of polymerization and the viscosity of cellulosic material which comprises reacting with cellulosic pulp at a consistency between 1 and 25% in an aqueous medium at a temperature between 0° C. and the boiling point of the solution, sodium chlorate in an amount between 0.1 and 10% on the pulp, sulfur dioxide in an amount between 192 and 576 parts per 106 parts of sodium chlorate, and sufficient acid to bring the pH between 1 and 6.5.
5. A process as set forth in claim 4 followed by bleaching the pulp.
6. A process as set forth in claim 4 followed by bleaching the pulp with a solution selected from the group consisting of sodium hypochlorite, peroxide and chlorine dioxide.
7. A process for lowering the degree of polymerization and the viscosity of cellulosic material which comprises reacting in an aqueous medium at a pH between 1 and 3.5, sodium chlorate, sulfur dioxide and the cellulosic material.
8. A process as set forth in claim 7 followed by bleaching the pulp with an alkaline sodium hypochlorite bleaching solution.
9. A process as set forth in claim 7 in which the reaction takes place in the presence of air.
10. A process for lowering the degree of polymerization and viscosity of cellulosic materials which comprises the addition of sulfur dioxide to a suspension of the cellulosic material in pulp form in an acid aqueous solution of sodium chlorate.
11. A process for lowering the degree of polymerization and viscosity of cellulosic material which comprises the addition of sodium chlorate to a suspension of the cellulosic material in pulp form in an aqueous solution of sulfur dioxide.

References Cited in the file of this patent
UNITED STATES PATENTS
679,203    Althausse _____ July 23, 1901

OTHER REFERENCES

J. Polymer Science, vol. 10, No. 6, pp. 577–578.
Paper Trade Journal, Sept. 5, 1952, pp. 22, 24, 26, 28, 30 and 32.
Paper Trade Journal, Aug. 21, 1953, pp. 26–31.